United States Patent Office 3,640,947
Patented Feb. 8, 1972

3,640,947
NON-TOXIC STABILIZED POLYVINYL CHLORIDE PRODUCTS AND STABILIZER COMPOSITIONS
Carl Robert Gloskey, Sterling, N.J., assignor to M & T Chemicals Inc., New York, N.Y.
No Drawing. Continuation of application Ser. No. 694,829, Jan. 2, 1968. This application June 25, 1970, Ser. No. 49,961
Int. Cl. C08f 45/62
U.S. Cl. 260—45.75 K                    11 Claims

ABSTRACT OF THE DISCLOSURE

The present invention provides a novel non-toxic organotin stabilizer composition containing about 95 percent of di(n - octyl)-Sn, S,S' - bis(isooctylmercaptoacetate). The stabilizer composition also contains specified amounts of other organic tin compounds. The invention also provides non-toxic polyvinyl chloride containing resins suitable for food packaging use.

This application is a continuation application of application S.N. 694,829 filed Jan. 2, 1968, now abandoned.

BACKGROUND OF THE INVENTION

The necessity for stabilizing polyvinyl chloride compositions to prevent resin degradation caused by heat and weathering has long been recognized. The stabilization problem has been particularly troublesome when manufacturing rigids and semi-rigids which are processed at relatively high temperatures. The problems are accentuated when extrusion processes are used. Polyvinyl chloride resins have been stabilized using various organotin compounds as the effective stabilizer.

Polyvinyl chloride containing resins have not been used for food packaging in the United States, although they have many characteristics indicating their desirability for such use. These characteristics include low price, easy processing characteristics, strength, suitability for preparation of attractive colored product which may be partially transparent, and the ability to prepare clear products which couple transparency with clarity. In spite of the suitability of polyvinyl chloride resins for food packaging use and the known non-toxicity of the polymer components of the resin, they have not been used in food packaging because of the reported toxicity of the requisite polyvinyl chloride stabilizers, and particularly the organotin stabilizers.

The ability to produce a stabilized non-toxic polyvinyl chloride containing resin using a specified compound as a stabilizer is dependent not only on the low toxicity or non-toxicity of the stabilizer, but also upon the mobility of the stabilizer in the stabilized resin, particularly under the leeching conditions that exist in many food packages. High liquid content food compositions and liquids used in food preparation of packaged as such, e.g., oils, may leech the stabilizer from the packaging. Stabilizers for food packaging must have little or no extractability under the service conditions contemplated and must be non-toxic in the amounts that may be extracted.

A need exists for stabilizers which will provide stabilized non-toxic polyvinyl chloride food packaging materials.

SUMMARY OF THE INVENTION

The present invention provides a novel stabilized composition useful for producing novel non-toxic stabilized polyvinyl chloride containing resin compositions and articles produced therefrom. The stabilized composition contains between 94.8% and 98.2% by weight, of di(n-octyl)tin S,S' - bis(isooctylmercaptoacetate); between about 1.8% and 5% of a total of mono-n-octyltin S,S',S''-tris(isooctylmercaptoacetate) and tri(n - octyl)tin S - isooctylmercarptoacetate, preferably with the mono compound composing all or the majority of said total of the mono and tri compounds. The stabilizer composition is admixed with the resin in amounts between 0.5% and 3%, and preferably at least 1%, with optimum results obtained between 2% and 3% by weight based on the amount of polymer in the resin composition.

DESCRIPTION OF THE PREFERRED EMBODIMENTS OF THE INVENTION

The organotin stabilizer composition contains between 94.8% and 98.2% by weight and preferably between 96% and 97.4% of di(n-octyl)tin S,S'-bis(isooctylmercaptoacetate); between about 1.8% and 5%, and preferably between about 2.3% and 4%, of a total of mono-n-octyltin S,S',S''-tris (isooctylmercaptoacetate) and tri(n-octyl)tin S-isooctylmercaptoacetate, preferably with the mono compound composing all or the majority of said total of the mono and tri compounds; up to 0.15% of di(2-ethylhexyl)tin S,S'-bis(isooctylmercaptoacetate); up to a total of 0.1% of all other organotin compounds; and not more than ten parts per million of a total of arsenic, antimony and lead. The stabilizer composition contains between 15.1% and 16.4% by weight, preferably about 15.9% of tin; between 8.1% and 8.9% of sulphur. The composition, a liquid, weighs about 8.9 pounds per gallon. It has a specific gravity of about 1.07. It has a maximum chlorine content of 0.5%. It has a pour point of less than 20° C. It is a slightly yellow liquid having a Gardner number of about 3.

The aforedescribed organotin stabilizer composition is prepared by reacting an octyltin oxide composition with isooctylmercaptoacetate. Two moles of the mercaptoacetate is reacted per mole of the octyltin oxide. The stoichiometry is preferably varied by using a slight excess of the isooctylmercaptoacetate. They are reacted in an inert hydrocarbon solvent such as hexane or heptane or benzene, by co-distillation of water and solvent. Residual solvent is stripped at reduced pressures. The liquid product is filtered. The octyltin oxide composition which is reacted to form the stabilizer composition of the present invention contains a maximum of 0.2% of di(2-ethylhexyl)tin oxide, a maximum of 5% of the total of mono-n-octylstannoic acid and bis(tri-(n-octyl)tin) oxide, a maximum of 25 parts per million of the total of arsenic, antimony, and lead, and the remainder di(n-octyl)tin oxide. The composition does not contain any detectable amount of di(isooctyl)tin oxide. The components of the octyltin oxide composition may be controlled by analysis, controlling the tin content between 31.5% and 33.5%, the chloride content at a maximum of 0.1%, and the loss on drying at a maximum of 1%.

The octyltin oxide composition is prepared by reacting the corresponding chloride composition, i.e., containing the corresponding di(n-octyl)tin di-chloride, and the analogous mono and tri compounds, with an excess of aqueous alkali. The resultant oxide is washed on the filter with an alcohol and water solvent, and dried. Control of the process to obtain the specified amounts of the di(n-octyl)tin compound, and also the specified amounts of the other component of the composition, is most readily obtained at the hydrocarbontin chloride stage of the process. These compounds are liquids and the determination of the relative proportions of the mono, di, and tri hydrocarbontin components is more readily determined.

The resins used to produce the packages which are stabilized in accordance with the present invention contain at least one homopolymer or copolymer of vinyl chloride or vinylidene chloride. The copolymers are those formed by the copolymerization of the vinyl chloride or vinylidene chloride with other ethylenically unsaturated monomers. These include acrylates such as acrylic acid, ethyl acrylate, acrylonitrile, etc.; vinyl monomers such as styrene, vinyl acetate, etc; maleates such as maleic acid, maleic anhydride, maleate esters, etc.; and olefinic monomers such as ethylene and propylene. The term "polyvinyl chloride containing resin" as used herein refers to resins containing a homopolymer or copolymer in which vinyl chloride or vinylidene chloride is the major component.

The preferred vinyl chloride containing resins for use in the manufacture of stabilized resin for food packaging purposes are polyvinyl chloride, vinyl chloride-vinyl acetate copolymers, vinyl chloride-fumaric acid copolymers, vinyl chloride-maleic acid copolymers, vinyl chloride-propylene copolymers, and vinyl chloride-ethylene copolymers.

The resin composition may also contain such additives as fillers, pigments, waxes, lubricating agents, plasticizers, other polymers, anti-oxidants, etc. The preferred plasticizers used in amounts of up to about 15% in semi-rigids and 50 to 60% in film are the non-toxic plasticizers such as butylbenzyl phthalate, dicyclohexyl phthalate, dihexyl phthalate, and di-2-ethylhexyl adipate. The resins used for preparing bottles may contain an impact modifying rubbery polymer, such as acrylonitrile-butadiene-styrene, or an acrylic ester, commonly used in amounts between about 3% and 20%. The preferred anti-oxidants are the hindered phenols, and particularly 2,6-di-tert-butyl-p-cresol, which are used in very small amounts, e.g., 3 to 5% of the weight of the stabilizer.

The resin compositions may be formed by milling, blending, or other commonly employed formulation techniques which uniformly disperse all the components of the resin composition, and particularly the stabilizer, throughout the resin. Sheet or film products are commonly prepared on rolls such as 2-roll differential mills. Semi-rigid products and rigid products may be formed by various casting techniques and also by blow molding.

EXAMPLES

The invention is further illustrated in the following examples. All parts and percentages herein are by weight unless otherwise designated.

EXAMPLE 1

A stabilizer composition contained about 96% of di-(n-octyl)tin S,S' - bis(isooctylmercaptoacetate), and about 3.5% of a total of mono-n-octyltin S,S',S''-tri(isooctylmercaptoacetate) and tri(n-octyl)tin S-isooctylmercaptoacetate with the mono compound being more than 50% of said total. The composition also contained about 0.15% of di(2-ethylhexyl)tin S,S'-bis(isooctylmercaptoacetate). This stabilizer composition was prepared by reacting isooctylmercaptoacetate and a di(n-octyl)tin oxide. The octyltin oxide and the reaction process is that described hereinbefore under the heading "Description of the Preferred Embodiments of the Invention." The stabilizer composition contained about 15.9% of tin and between 8.1 and 8.9% of sulphur. It was a liquid weighing about 8.9 pounds per gallon with a specific gravity of about 1.07. It had a pour point of less than 20° C. It was slightly yellow having a Gardner number of about 3. The stabilizer composition of this example was used to stabilize the resin compositions of the subsequent examples.

EXAMPLE 2

One hundred parts of a polyvinyl chloride homopolymer having a molecular weight of between about 40,000 and 50,000 (sold under the trademark "Geon 103 EP") were uniformly admixed with the stabilizer composition of Example 1. A number of samples were prepared with two parts of the stabilizer composition, and other samples prepared with three parts of the stabilizer composition. The mixture was mixed on a 2-roll differential mill heated to about 325° F. A continuous band of the composition which forms around one of the rolls was cut and the composition removed from the hot roll as a continuous sheet. A sheet of each of the samples was cut into small squares which were tested for heat stability by being placed in an air oven regulated to maintain a temperature of about 375° F. The samples are heated and samples taken from the oven over specified time sequence, e.g., at 5 minute intervals, at 15 minute intervals, etc. These oven tests determined that all of the samples had excellent heat stability.

EXAMPLE 3

The procedure of Example 2 was followed except that 100 parts of a polyvinyl chloride homopolymer having a molecular weight of between about 80,000 and 100,000 was used, together with 0.5 part of a lubricant calcium stearate, and 15 parts of a butylbenzyl phthalate. Different samples were admixed with either two or three parts of the stabilizer composition. Semi-rigid sheets were formed on the rolls and then tested in the oven. All of the sheets exhibited excellent heat stability.

EXAMPLE 4

The procedure of Example 3 was followed and the same materials used except that 50 parts of the phthalate plasticizer was used, and the product was a thin flexible film. Oven tests determined that the film also had excellent heat stability.

EXAMPLE 5

Clear transparent bottles were prepared by extruding a blended resin composition at a temperature of approximately 420° F. to form a parison (a hollow tube) which was fixed in a mold. A needle is inserted into the parison and air blown through the needle forming the bottle.

Bottles were formed from resin compositions containing 100 parts of a polyvinyl chloride homopolymer, 0.5 part of calcium stearate, and 2 parts of the stabilizer composition. Other bottles were formed in the same fashion except that they contained three parts of the stabilizer composition.

Another set of bottles were formed from compositions which differed from the foregoing only that they also contained 15 parts of an acrylonitrile-butadiene-styrene impact modifier.

A third set of bottles were prepared utilizing 100 parts of vinyl chloride propylene copolymer containing between about 4 or 5% of propylene, one part of a lubricant glycerol monostearate, and two parts of the stabilizer composition.

All the bottles were clear and transparent. Samples cut from the bottles and subjected to the oven test exhibited excellent heat stability. Those bottles prepared from the copolymer and the composition containing the impact modifier, had the toughness requisite for commercial use.

Although the composition exemplified were stabilized with either two parts or three parts of the stabilizer composition per hundred parts of polymer, stabilized resins are obtained using lesser amounts of the stabilizer, e.g., 1%. As a general rule, greater stability is obtained with increasing amounts of stabilizer within the range specified. The preferred range of between two and three parts of stabilizer encompasses the more severe commercial processing systems and service characteristics. Smaller amounts of stabilizer may be used to meet less exacting requirements.

Similar excellent stabilized polyvinyl chloride containing resins are obtained using the specified stabilizer compositions with resins other than those exemplified, such as vinylidene chloride, vinyl chloride-vinyl acetate copolymers, vinyl chloride-fumaric acid copolymers, vinyl chloride-maleic acid copolymers, and vinyl chloride-ethylene copolymers.

The safety of the food packaging prepared from the stabilized polyvinyl chloride of the present invention was established by elaborate physical and pharmacological studies. The amount of the organotin stabilizer that is extracted or leeched from the packaging by various foods (both liquid and solid) was determined. The quantity of the organotin stabilizer that produced toxic effects on animals was independently determined. Extensive toxicity studies followed to determine whether the quantity of the organotin stabilizer that could be extracted would have any toxic effect upon animals. Animal studies were determined to be suitable for this study and correlated to effects on humans by past experience of those skilled in this field.

Polyvinyl chloride compositions were prepared as exemplified hereinbefore by compounding one hundred parts of a polyvinyl chloride homopolymer having a molecular weight of about 40,000–50,000 (sold under the trademark "Geon 103 EP"), with the stabilizer composition exemplified herein, and 0.5 part of calcium stearate. Samples were prepared with two parts of the stabilizer composition, and other samples with three parts.

Other polyvinyl chloride resins in the form of bottles were formed from resin compositions containing the aforelisted components in the amounts noted, and which also contained fifteen parts of an acrylonitrile-butadiene-styrene impact modifier. Sheets and bottles formed from these resin compositions were immersed in various foods including French dressing, vegetable oil, vinegar, etc., to determine the amount of the organotin extracted. Hexane was also used as an extractant. Numerous tests established that almost the entire amount of the organotin stabilizer extracted, was extracted during the early period of extraction. Thus, tests run after one or two hours established a specified extraction level. If the extracting medium was then removed and the test article again immersed in another sample of the extracting medium, it was determined that there was little if any further extraction of the organotin stabilizer. Tests extended from periods of less than an hour to more than a week. The results of these tests may be summarized by stating that all values of tin determined in the extracting medium were below 0.5 part of tin per one million parts of the extracting medium.

Tests run to determine the amount of the organotin stabilizer toxic to animals, resulted in an $LD_{50}$ oral of 1.00 (0.71–1.4) gm./kg. This value indicates a material having toxicity of a low order, i.e., a relatively harmless material.

The tests that determined the $LD_{50}$ value also indicated that about 225 parts of the organotin stabilizer per million parts of the animal feed (hereinafter referred to as p.p.m.) had some toxic effect on the animals. These tests also determined that di(2-ethylhexyl)Sn S,S'-bis-(isooctylmercaptoacetate) was approximately thirty times as toxic as di(n - octyl)Sn S,S' - bis(isooctylmercaptoacetate).

Two-year animal studies were then started utilizing an initial rat group of 500 rats, and a dog group of 102 dogs. The stabilizer composition exemplified herein was admixed in the animals' feed in amounts of 20 p.p.m., 50 p.p.m., and 150 p.p.m. One group of the animals were fed the feed containing 20 p.p.m. of the stabilizer composition, a second group were fed the feed containing 50 p.p.m. of the stabilizer composition, and a third group were fed the feed containing 150 p.p.m. of the stabilizer composition. A small group of animals were sacrificed at the end of three months, a second small group at the end of six months, and the remaining animals at the end of two years. The animals were observed during the entire period. The animals fed the organotin stabilizer composition are referred to hereinafter as the "test group." A control group of animals were fed the same feed except that it contained none of the organotin stabilizer composition. The study was essentially a statistical study comparing and correlating the condition of the animals fed the organotin stabilizer composition, with the control group.

The weight of the animals was recorded regularly and gains and losses noted. It was determined that the test group did not differ statistically from the control group.

The mortality rate of the test group was determined not to differ from that of the control group. There were no observed differences in the illnesses acquired by the test group and the control group. Animals which were accidentally injured did not exhibit any significant difference in healing rate.

The behavior of the animals was regularly and systematically studied. There were no observed group differences. There was no unusual aggressiveness, lethargy, or food preferences.

The sacrificed animals were studied in detail. No significant differences were determined in the blood chemistry or hematology of the two groups. Similarly no oxygen/body weight ratio differences were determined.

At autopsy, no gross pathology differences were noted between the test animals and the control group. A specified group of fourteen organs were examined from each animal. Each of the organs was visually examined and a tissue slide prepared and microscopically examined. These examinations indicated no significant differences between the test group and the control group.

A sample was taken from each of the organs and analyzed to determine the organotin and total tin content. The analytical determinations indicated that although both the rat and dog tissue appeared to have absorbed the organotin stabilizer, the tin is not stored as such. The tin appears to have been subjected to rapid dealkylation, forming inorganic tin. The inorganic tin levels were correlated to the tin content found in human organs and determined to be at levels consistent with or below those found in humans. Humans are known to ingest considerable amounts of tin during their lifetime from various sources, the largest source presumably being "tin" cans.

In summary, the results establish that the organotin stabilizer composition of the present invention may be ingested by animals in amounts in excess of 100 times the quantity that appears to be extracted from the food packaging, without causing adverse effects to the animals over a period of two years. This data when correlated with past experience leads scientists in this field to conclude that stabilized polyvinyl chloride stabilized with up to three parts of the stabilizer composition of the present invention is a safe material for food packaging.

Although this invention has been illustrated by reference to specific examples, changes therein which clearly fall within the scope of the invention will be apparent to those skilled in the art. It is, therefore, to be limited solely by the scope of the appended claims.

What is claimed is:

1. A non-toxic stabilized polyvinyl chloride containing resin composition consisting essentially of a homopolymer or copolymer of vinyl chloride containing between 0.5% and 3% by weight based on the amount of polymer in the resin composition of a stabilizer composition comprising between 94.8% and 98.2% by weight of di(n-octyl) tin S,S'-bis(isooctylmercaptoacetate), between 1.8% and 5% by weight of either mono-n-octyltin S,S',S''-tris(isooctylmercaptoacetate) or tri(n-octyl) tin S-isooctylmercaptoacetate, or mixtures thereof up to about 0.15% by weight of di(2-ethylhexyl) tin S,S'-bis(isooctylmercaptoacetate).

2. The non-toxic stabilized resin composition of claim 1 containing between 1% and 3% of said stabilizer composition.

3. The non-toxic stabilized resin composition of claim 2 wherein said polyvinyl chloride containing resin is selected from the group consisting of polyvinyl chloride, vinyl chloride-vinyl acetate copolymers, vinyl chloride-fumaric acid copolymers, vinyl chloride-maleic acid copolymers, vinyl chloride-propylene copolymers, and vinyl chloride-ethylene copolymers; and wherein the tin content of said organotin stabilizer composition is between 15.5% and 16.4% by weight and the sulphur content of said stabilizer composition is between 8.1% and 8.9% by weight.

4. The non-toxic stabilized resin composition of claim 3 containing said stabilizer composition in an amount between 2% and 3%, wherein said stabilizer composition contains between 96% and 97.4% of said di(n-octyl) tin S,S'-bis(isooctylmercaptoacetate), and contains between 2.3% and 4% of a total of said mono-n-octyltin S,S',S''-tris(isooctylmercaptoacetate) and tri(n-octyl) tin S-isooctylmercaptoacetate, and wherein the mono compound composes all or the majority of said total of said mono and tri compounds.

5. The non-toxic stabilized resin composition of claim 4 wherein said polyvinyl chloride containing resin is a polyvinyl chloride homopolymer, or a vinyl chloride-propylene copolymer with the vinyl chloride being at least 90% of said copolymer.

6. A clear transparent bottle prepared from the stabilized non-toxic resin composition of claim 5.

7. A liquid stabilizer composition for preparing stabilized polyvinyl chloride containing resin food packaging material comprising between 94.8% and 98.2% by weight of di(n-octyl) tin S,S'-bis(isooctylmercaptoacetate), and between 1.8% and 5% by weight of either mono-n-octyltin S,S',S''-tris(isooctylmercaptoacetate) or tri(n-octyl) tin S-isooctylmercaptoacetate mixtures thereof, said composition containing between 15.1% and 16.4% by weight of tin and between 8.1% and 8.9% by weight of sulphur, said composition weighing about 8.9 pounds per gallon and having a specific gravity of about 1.07, with a pour point of less than 20° C.

8. The stabilizer composition of claim 7 wherein said di(n-octyl) tin S,S'-bis(isooctylmercaptoacetate) is in an amount between 96% and 97.4%.

9. The stabilizer composition of claim 7 wherein said tin is in amount about 15.9%.

10. The stabilizer composition of claim 9 which also contains di(2-ethylhexyl) tin S,S'-bis(isooctylmercaptoacetate) in an amount up to 0.15% and other organotin compounds in an amount up to 0.1% and which also contains arsenic, antimony, or lead in a total amount up to ten parts per million.

11. The stabilizer composition of claim 10 wherein said di(n-octyl) tin S,S'-bis(isooctylmercaptoacetate) is in an amount of about 96%, and wherein the total of said mono-n-octyltin and tri-n-octyltin compounds is in an amount of about 3.5% with between 50% and 100% of said total being the said mono compound.

References Cited
UNITED STATES PATENTS

| | | | |
|---|---|---|---|
| 2,789,963 | 4/1957 | Hecker | 260—45.75 |
| 3,230,037 | 1/1966 | Kunz | 260—45.75 |
| 3,363,028 | 1/1968 | Szalay | 260—23 |
| 3,390,159 | 6/1968 | Katsumura | 260—45.75 |
| 3,422,127 | 1/1969 | Fish | 260—429.7 |
| 3,424,717 | 1/1969 | Gottlieb | 260—45.75 |

DONALD E. CZAJA, Primary Examiner

V. P. HOKE, Assistant Examiner

U.S. Cl. X.R.

99—171, 181; 252—404, 406; 260—45.95